United States Patent
Gallas et al.

(10) Patent No.: US 7,997,584 B2
(45) Date of Patent: Aug. 16, 2011

(54) PISTON RING FOR THE PISTON OF AN INTERNAL COMBUSTION ENGINE

(75) Inventors: Tino Gallas, Stuttgart (DE); Klaus Koeble, Gerlingen (DE); Leandro Mileo Martins, Mogi Guacu (BR)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 12/451,994

(22) PCT Filed: Jun. 13, 2008

(86) PCT No.: PCT/DE2008/001013
§ 371 (c)(1),
(2), (4) Date: Dec. 11, 2009

(87) PCT Pub. No.: WO2008/151619
PCT Pub. Date: Dec. 18, 2008

(65) Prior Publication Data
US 2010/0117305 A1 May 13, 2010

(30) Foreign Application Priority Data
Jun. 13, 2007 (DE) .......................... 10 2007 027 223

(51) Int. Cl.
*F16J 9/12* (2006.01)
(52) U.S. Cl. ....................................... 277/460; 277/493
(58) Field of Classification Search .................. 277/434, 277/459, 460, 466, 489, 490, 498, 499, 493
See application file for complete search history.

(56) References Cited

U.S. PATENT DOCUMENTS

| 1,393,542 | A |   | 10/1921 | Kistner |
|---|---|---|---|---|
| 2,459,395 | A | * | 1/1949 | Smith ........................... 277/460 |
| 2,591,920 | A |   | 4/1952 | Colvin |
| 2,798,779 | A | * | 7/1957 | Swartz et al. ................. 277/466 |
| 3,561,087 | A | * | 2/1971 | Packard .......................... 419/26 |
| 3,587,155 | A | * | 6/1971 | Koehler .................. 29/888.075 |
| 3,618,960 | A | * | 11/1971 | Koehler ....................... 277/440 |
| 3,862,480 | A | * | 1/1975 | Packard et al. ............ 29/888.01 |
| 4,040,637 | A | * | 8/1977 | McCormick ................. 277/460 |
| 6,997,460 | B2 |  | 2/2006 | Brunke |

(Continued)

FOREIGN PATENT DOCUMENTS

DE    16 75 485    4/1954

(Continued)

OTHER PUBLICATIONS

International Search Report.

*Primary Examiner* — Thomas A Beach
*Assistant Examiner* — Gilbert Y Lee
(74) *Attorney, Agent, or Firm* — Collard & Roe, P.C.

(57) ABSTRACT

A piston ring for the piston of an internal combustion engine, comprising, on a lower side of the piston ring, a circular, radially inner bezel, the width thereof reducing, on both sides of the ring stop, up to the side of the piston ring that is opposite the ring stop, in a symmetrical manner in relation to a radially situated axis and runs through the ring stop, and the bezel on the lower side of the piston ring is arranged away from the piston base. A good oil-scraping effect of the piston ring is obtained over the entire periphery of the inner wall of the cylinder.

1 Claim, 2 Drawing Sheets

U.S. PATENT DOCUMENTS 7,494,129 B2 2/2009 Breuer et al.

FOREIGN PATENT DOCUMENTS

| | | |
|---|---|---|
| DE | 92 616 | 5/1984 |
| DE | 34 20 404 | 3/1985 |
| DE | 100 44 241 | 3/2002 |
| DE | 103 08 069 | 8/2004 |
| JP | 58207575 A * | 12/1983 |
| JP | 02-229964 | 9/1990 |
| WO | WO 2004/088179 | 10/2004 |

* cited by examiner

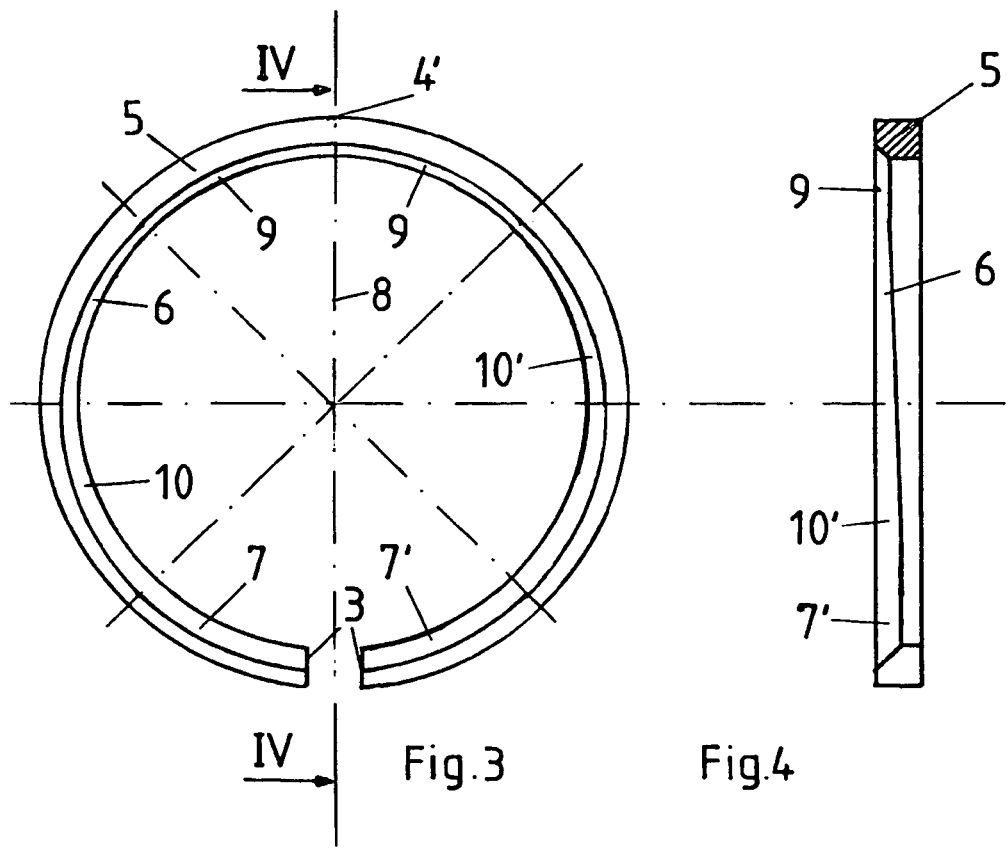
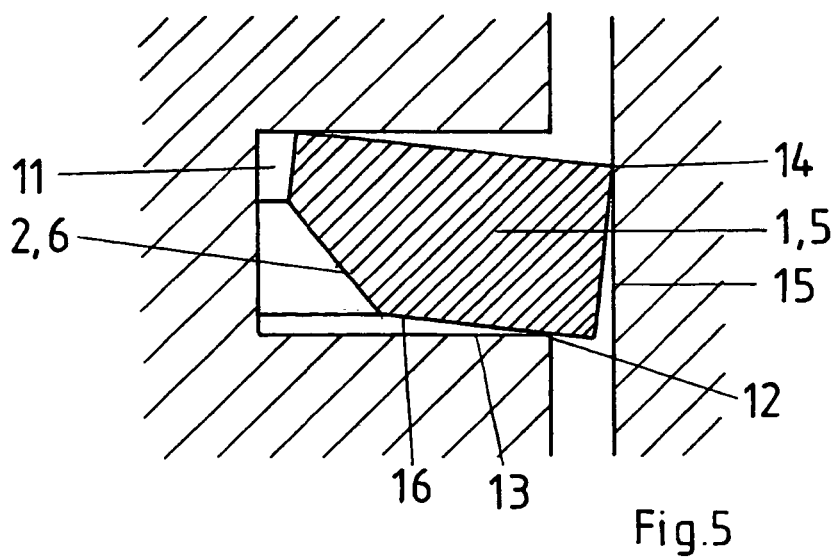

PISTON RING FOR THE PISTON OF AN INTERNAL COMBUSTION ENGINE

CROSS REFERENCE TO RELATED APPLICATIONS

This application is the National Stage of PCT/DE2008/001013 filed on Jun. 13, 2008, which claims priority under 35 U.S.C. §119 of German Application No. 10 2007 027 223.7 filed on Jun. 13, 2007. The international application under PCT article 21(2) was not published in English.

BACKGROUND OF THE INVENTION

The invention relates to a piston ring for the piston of an internal combustion engine, having a circumferential chamfer lying on the inside, the size of which decreases symmetrically to an axis that lies radially and runs through the ring joint, on both sides of the ring joint, all the way to the side of the piston ring that lies opposite to the ring joint.

A piston ring for the piston of an internal combustion engine, having a circumferential chamfer lying on the inside, the size of which decreases constantly, proceeding from the ring joint to the side of the piston ring that lies opposite to the ring joint, and which chamfer is disposed on the upper side of the piston ring, is known from the U.S. Pat. No. 2,591,920. A chamfer that lies on top and on the inside has the effect that the piston ring experiences a positive twist under mechanical stress, i.e. that when this happens, the upper side of the piston ring is given a conical shape that opens toward the top. In this way, the outer edge of the upper ring groove wall makes contact with the upper side of the piston ring, so that an improved seal of the piston ring relative to the combustion gases of the combustion chamber, which are under pressure, is achieved in this region.

In the event of positive twisting of the piston ring, the lower, inner edge of the piston ring makes contact with the lower ring groove wall, thereby causing a circumferential gap to form, which becomes ever narrower radially on the inside, and leads to a poor sealing effect of the piston ring relative to the oil stripped off from the inner cylinder wall by its outer, lower edge.

SUMMARY OF THE INVENTION

It is the task of the invention to avoid this disadvantage of the piston ring known from the state of the art, and to create a piston ring that demonstrates a good sealing effect relative to the oil stripped off from the inner cylinder wall, so that the piston ring is suitable as an oil control ring or as a second piston ring between the compression ring and the oil control ring.

This task is accomplished in that the chamfer is disposed on the lower side of the piston ring, which faces away from the piston crown.

In this connection, the symmetrical reduction in size of the chamfer on both sides of the ring joint, in combination with the characteristic that the chamfer is disposed on the underside of the piston ring, has the advantage that the piston ring, which is under stress, experiences uniform negative twisting over its entire circumference, whereby the underside of the piston ring comes into contact with the outer edge of the lower groove wall, thereby resulting in a uniformly good oil stripping effect of the piston ring over the entire circumference of the inner cylinder wall.

Practical embodiments of the invention are the object of the dependent claims.

BRIEF DESCRIPTION OF THE DRAWINGS

Some exemplary embodiments of the invention will be described below, using the drawings. These show.

DETAILED DESCRIPTION OF THE EMBODIMENTS

Figures 1, 2:
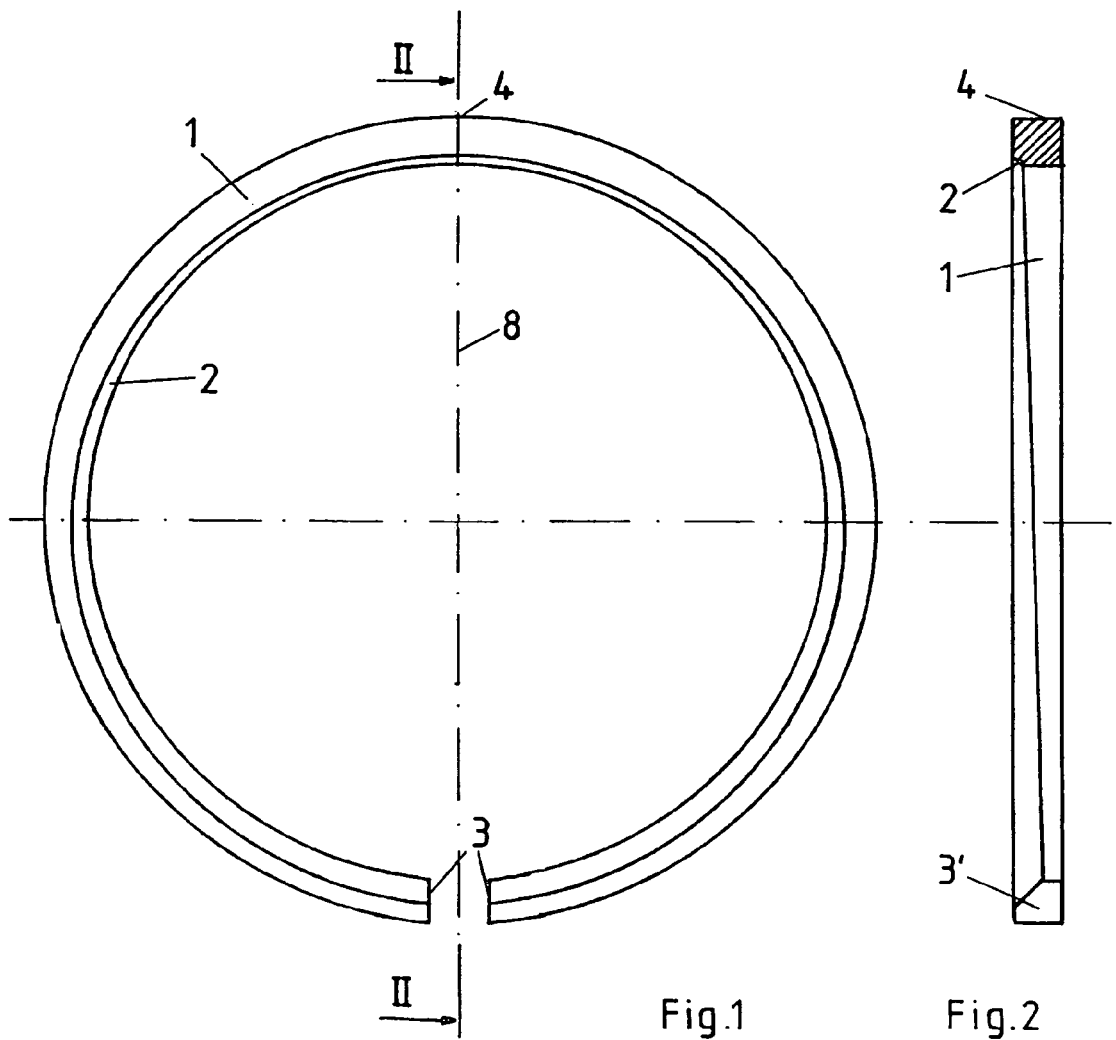
FIG. 1 the bottom view of a first embodiment of a piston ring, having a lower chamfer that lies in the inside, the size of which constantly decreases, proceeding from the ring joint, all the way to the opposite side of the piston ring, FIG. 2 a section through the piston ring along the line II-II in FIG. 1, FIG. 3 the bottom view of a second embodiment of a piston ring, having a lower chamfer that lies in the inside, which has multiple regions having a size that is partly constant and partly varies over the progression of the chamfer, FIG. 4 a section through the piston ring according to FIG. 3 along the line IV-IV in FIG. 3, and FIG. 5 a section through a piston ring that has been laid into a piston ring groove and is under mechanical stress.

FIG. 1 shows the bottom view of a piston ring 1, which finds use as a second piston ring disposed between the compression ring and the oil control ring, in the case of a piston having three piston rings. FIG. 2 shows a section through the piston ring 1 along the line II-II in FIG. 1, whereby the lower part of the sectional image shows one of the joint ends 3' of the piston ring 1, because of the position of the sectional plane. It can be seen in FIGS. 1 and 2 that the piston ring 1 has a chamfer 2 disposed on its underside and on the inside, which is configured as a disruption in cross-section that narrows conically upward.

The chamfer 2 has its maximal size in the region of the ring joint 3, while the chamfer 2 has its minimal size on the side 4 of the piston ring 1 that lies opposite to the ring joint 3. According to the exemplary embodiment of the piston ring 1 shown in FIGS. 1 and 2, the size of the chamfer 2 constantly decreases, proceeding from the ring joint 3 to the side 4 of the piston ring 1 that lies opposite to it.

According to an exemplary embodiment of the piston ring 5 shown in FIGS. 3 and 4, the chamfer 6 has a joint region 7, 7' on both sides of the ring joint 3, in which the chamfer 6 has a constant size. On the side 4' of the piston ring 5 that lies opposite to the ring joint 3, the chamfer 6 has a center region 9 having a constant size, on both sides of the radial axis 8. In the joint regions 7 and 7', the chamfer 6 is configured to be larger than in the center region 9. On both sides of the radial axis 8, the joint regions 7 and 7' of the chamfer 6 are connected with the center region 9 by way of a connection region 10 and 10', in each instance. The size of the connection regions 10, 10' constantly decreases from the contact locations with the joint regions 7, 7', where the connection regions 10, 10' have the same size as the joint regions 7, 7', all the way to the contact locations with the center region 9, where the connection regions 10, 10' have the same size as the center region 9.

As FIG. 5, a section through a piston ring 1, 5 laid into a piston ring groove 11, shows, when the piston equipped with the piston ring is inserted into the engine cylinder, the mechanical stress exerted on the piston ring in this connection brings about torsion of the piston ring 1, 5. Since the chamfer 2, 6 of the piston ring 1, 5 is disposed at the bottom and on the inside, a rotation in the clockwise direction occurs in the case of the section shown in FIG. 5, through the right half of the piston ring 1, 5, and a rotation in the counterclockwise direction occurs in the left half of the piston ring 1, 5, not shown. This type of torsion of a piston ring is called negative twisting, and has the advantage that the outer edge 12 of the lower wall 13 of the piston ring groove 11 comes into contact with the lower side 16 of the piston ring 1, 5. As a result, the piston ring groove 11, in the region of the edge 12, is sealed with regard to oil stripped off from the inner cylinder wall 15 by the outer, upper edge 14 of the piston ring 1, 5, resulting in a good oil control effect of the piston ring 1, 5.

In this connection, it has been shown that a chamfer that constantly decreases, proceeding from the ring joint 3 all the way to the side 4 of the piston ring 1 that lies opposite to the ring joint 3, brings about the result that the degree of twisting of the piston ring 1, 5 in the region of the ring joint 3 is approximately the same as on the side 4, 4' of the piston ring 1, 5 that lies opposite to the ring joint 3.

This results in the advantage of the present invention, that the chamfer 2, 6 disposed on the bottom and on the inside, and constantly decreasing in size from the ring joint 3 all the way to the side 4, 4' of the piston ring 1, 5 that lies opposite to the ring joint 3, brings about approximately uniform negative twisting over the entire circumference of the piston ring 1, 5 and thus a good oil control effect over the entire circumference of the inner cylinder wall 15.

Furthermore, in this way, the result is achieved that the piston ring, which is under mechanical stress, does not rise up in the region of its joint ends, that as a result, the upper edges of the joint ends do not come into contact with the upper wall of the ring groove, and that therefore, the piston ring does not wear excessively in the region of its joint ends.

The configuration of the chamfer 6 according to FIGS. 3 and 4 furthermore has the advantage that twisting of the mechanically stressed ring can be influenced in targeted manner by way of the selection of the size of the regions 7, 9, 10, in which the chamfer, considered over the ring circumference, partly has a constant size (regions 7, 7' and 9) and partly has a constantly decreasing size (regions 10, 10'), so that independent of the size of the piston and therefore of the piston ring, and independent of the kinetic stress on the piston, twisting of the ring is just as great in the region of the joint 3 as on the side 4, 4' of the ring that lies opposite to the joint 3. A gap between the ring underside and the lower wall of the piston ring groove and therefore a deterioration of the oil control effect in the joint region of the ring are thereby avoided, to the greatest possible extent.

REFERENCE SYMBOL LIST 1 piston ring
2 chamfer
3 ring joint
3' joint end
4, 4' side of the piston ring that lies opposite to the ring joint 3
5 piston ring
6 chamfer
7, 7' joint region of the chamfer 6
8 radial axis
9 center region of the chamfer 6
10, 10' connection region
11 piston ring groove
12 outer edge of the lower wall of the piston ring groove 11
13 lower wall of the piston ring groove 11
14 outer, upper edge of the piston ring
15 inner cylinder wall
16 lower side of the piston ring

The invention claimed is:

1. A piston ring for a piston of an internal combustion engine having a piston crown, comprising:
    a ring joint;
    a side of the piston ring lying opposite the ring joint; and
    a circumferential chamfer that lies radially on an inside of the piston ring, a size of said chamfer decreasing symmetrically to an axis that lies radially and runs through the ring joint, on both sides of the ring joint, all the way to the side of the piston ring that lies opposite to the ring joint,
    wherein the chamfer is disposed on a lower side of the piston ring, which faces away from the piston crown,
    wherein the chamfer has a joint region on both sides of the ring joint, and a center region on a side of the piston ring that lies opposite to the ring joint;
    wherein a size of the chamfer in the joint regions and in the center region is constant, and is greater in the joint regions than in the center region,
    wherein each of the joint regions are connected with the center region by way of a connection region,
    wherein the chamfer has the size of the chamfer of the joint regions in connection regions at the contact locations with the joint regions, and the size of the chamfer of the center region at the contact locations with the center region,
    wherein the size of the chamfer in the connection regions constantly decreases, proceeding from the contact locations with the joint regions, all the way to the contact locations with the center region, and
    wherein a size of the center region, the connection regions and the joint regions is freely selectable so that a degree of twist of the piston ring in the region of the joint is equal to a degree of twist on an opposite side of the piston ring.

* * * * *